April 9, 1935.  W. C. WEBER  1,997,161
GRIT REMOVAL APPARATUS
Original Filed Dec. 14, 1923  4 Sheets-Sheet 3
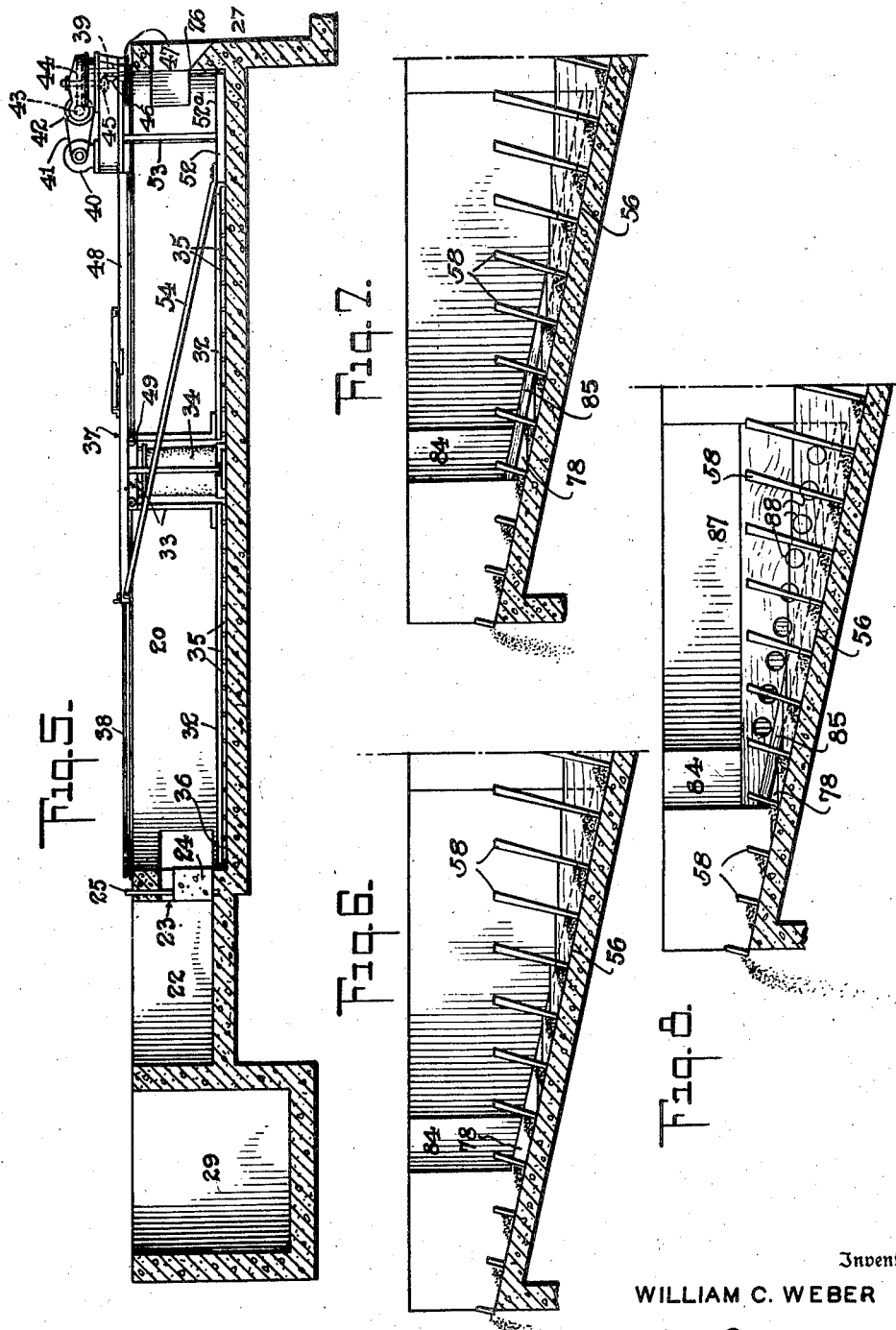
Inventor
WILLIAM C. WEBER
Attorney

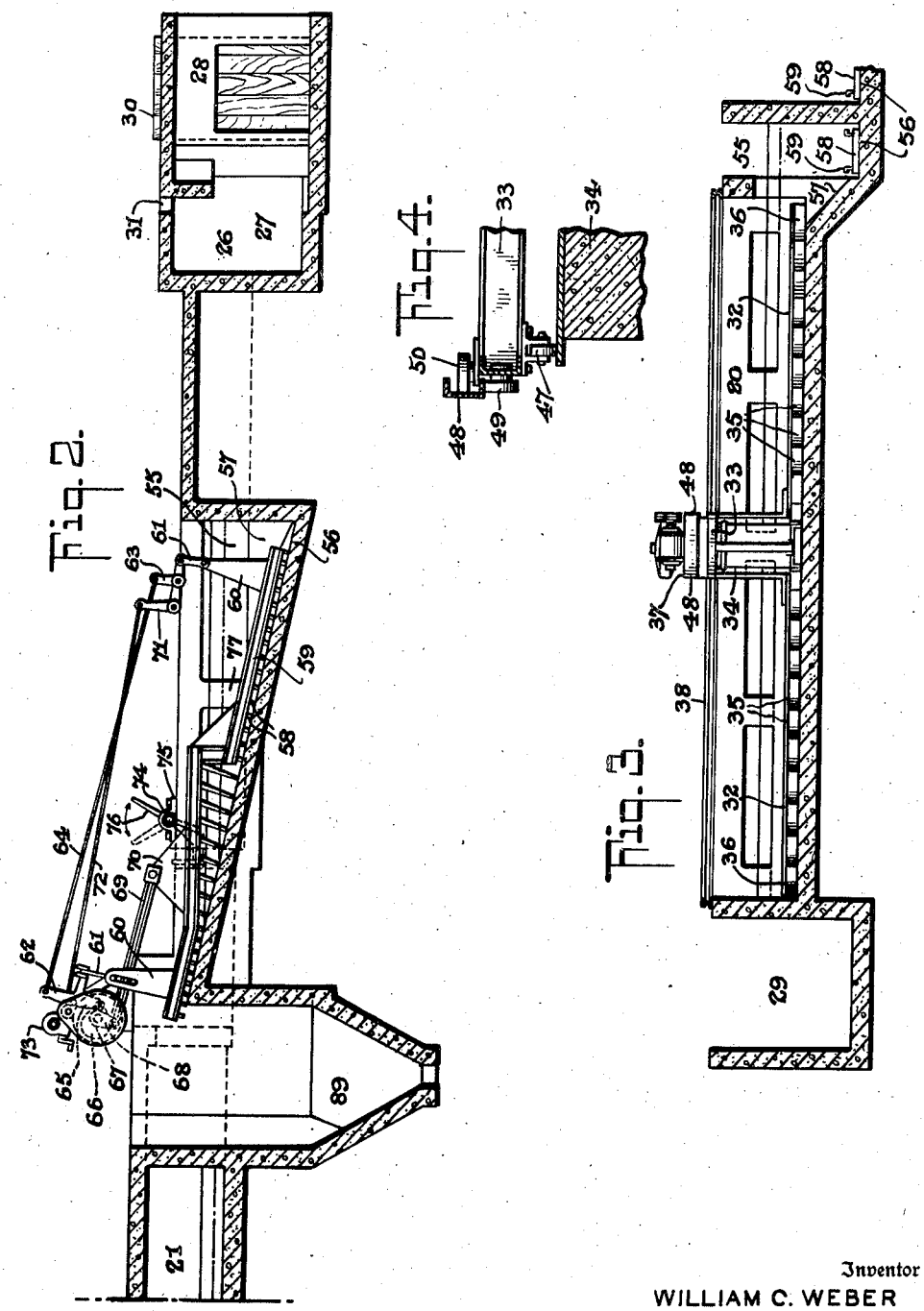

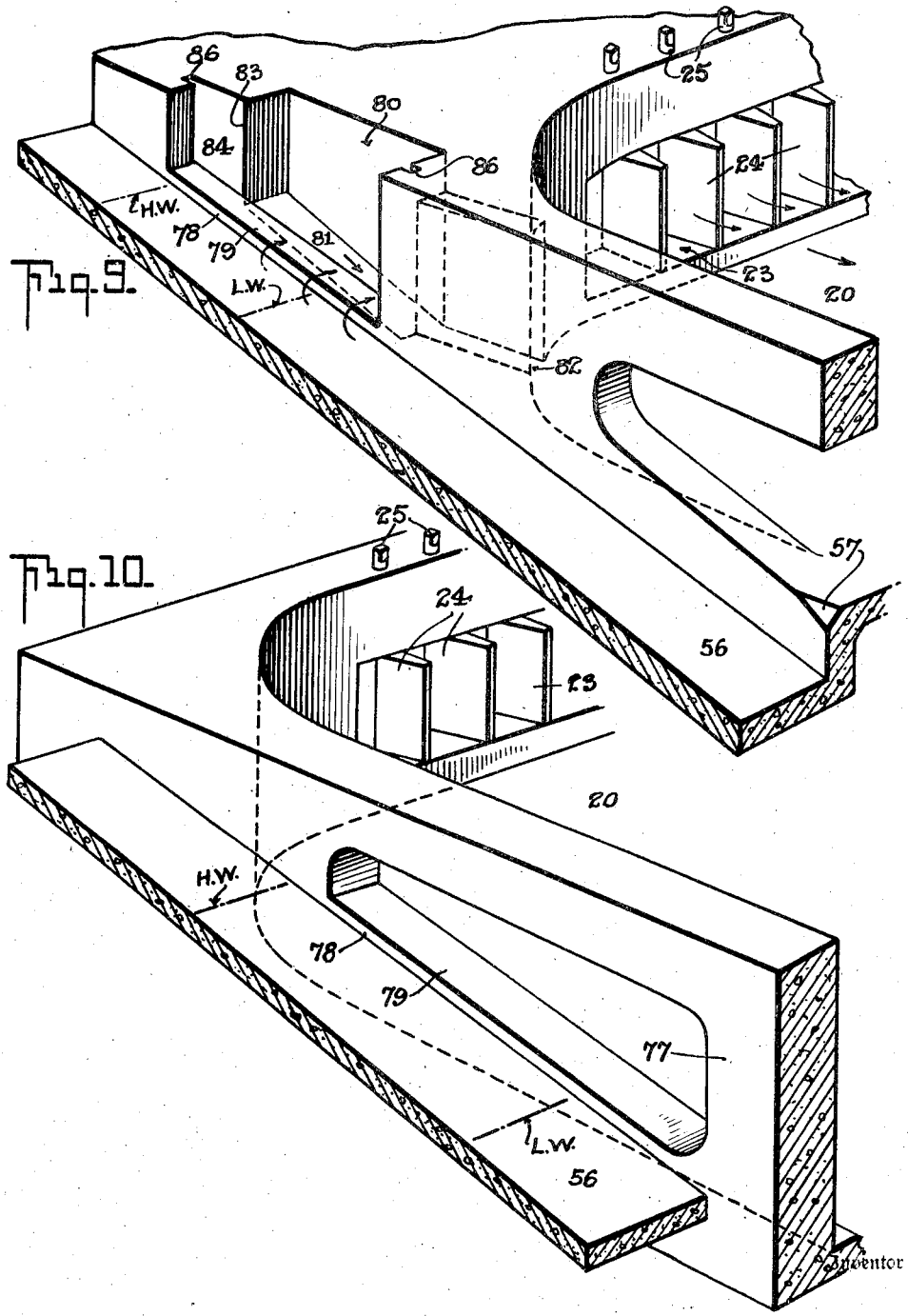

Patented Apr. 9, 1935

1,997,161

UNITED STATES PATENT OFFICE.

1,997,161

GRIT REMOVAL APPARATUS

William C. Weber, Larchmont, N. Y., assignor to The Dorr Company, Inc., New York, N. Y., a corporation of Delaware Original application December 14, 1928, Serial No. 328,155. Divided and this application July 15, 1932, Serial No. 622,899

2 Claims. (Cl. 210—3)

The invention relates to apparatus for removing grit in a cleaned or washed condition from sewage or other forms of industrial or commercial waste waters, wherein there exists not only the grit or gritty inorganics but also other organic solids in the liquid body wherein the grit is encountered and from which it should be early removed.

The invention is directed to apparatus employed or employable in a flowing stream of sewage and constructed so as to provide a sedimentation basin or grit settling chamber interposed in the flowing stream and having associated therewith a classifier or grit washing and eliminating means. The stream of sewage passes into the basin and because of the enlarged area of the basin, the sewage flow is slowed down therein sufficiently to permit of the operation of hydro-separation forces so that certain of the solids carried by the sewage are selectively caused to settle in the basin by sedimentation.

Ideal hydroseparation if realizable would cause all of the heavier solids (inorganics) of the sewage to settle, while preventing the settling or sedimentation of the lighter solids (organics), but in practice this ideal condition is not attainable. In hydro-separation as it is practically carried out, the lighter organic solids remain suspended but some of the organic solids are entrained or settle with the settling inorganics, thus forming a mixed sludge.

The mixture of inorganics and entrained organics which settle as sludge in the sedimentation basin is collected and conveyed to the classifier. The functioning of the classifier is to cause a still sharper separation of the gritty inorganics from the organics by agitating the sludge and by passing the grit of the sludge from submergence to emergence whereby the organics are eliminated therefrom. Thereafter the grit which is passed to emergence is discharged. During the passage of the grit from submergence to emergence there follows an induced restoring or return of the organics eliminated from the grit to the flowing stream of sewage in the settling basin in a manner whereby the thus restored organics flow out from the basin with the organics of the sewage which did not become entrapped or settled with the settling inorganics.

Thus the hydro-separation or selective sedimentation and the associated classification causes the sewage flowing from the basin to contain substantially all of the organic solids initially therein, with said organic solids in submergence but suspended in the outflowing effluent stream. The organic solids that pass off in the effluent stream are largely of a putrescible nature and accordingly encounter further treatment in a complete sewage treatment plant.

The sedimentation basin of the apparatus to which the present invention is directed is provided with means for collecting from the diverse sections of the bottom of the sedimentation basin the deposited solids or sludge found thereupon and which as indicated comprises the gritty inorganics, viz., the gritty inorganics with which there is interspersed a certain amount of the organic solids. The sedimentation basin is also provided with means for transferring while still submerged the thus collected sludge to a position where it is dumped or discharged into the lower end of a trough of an associated classifier that constitutes a part of the grit washing and grit eliminating apparatus. This classifier has an operating element associated with the trough and which functions to agitate the sludge delivered into the trough and to effect an agitation of the gritty solids and a transfer of the same upwardly along the trough to an upper zone whereat it emerges under the conditions of operation from the liquid in the classifier trough as cleaned or washed grit, while at the same time leaving the organic solids behind in the liquid as rejected organics. The operative element of the classifier, to wit, that operating element which effects the agitation of the sludge and the grit therein and the upward transfer of the gritty solids along and from the trough, is such as to effect a super-elevation of the liquid in the classifier in the upper regions where the gritty inorganics leave the liquid. As just indicated, the operating element effects a transfer of the cleaned and washed grit from its place of emergence upwardly along the trough until it is discharged into a receiving bin or space provided therefor and which is exteriorly located in respect to the sewage stream.

The classifier construction is such that a relatively free or unobstructed backflow or passage-way exists and extends from the zone or region where the grit emerges from the liquid in the classifier to and into the sedimentation basin or, in other words, to and into the stream of sewage flowing into, through and from the sedimentation basin or grit chamber. Otherwise expressing the functional feature just referred to, it will be noted that there follows as the result of said super-elevation of the liquid within the trough, and more particularly in the region of the zone of emergence for the grit, a free or relatively unobstructed backflow or return of liquid with rejected organics suspended therein directly from said region or zone from which the gritty inorganics emerged as washed grit or sand to and into the stream of sewage flowing through the sedimentation basin or grit chamber.

It will therefore be seen that the primary function of the apparatus just described is to effect an early separation of the gritty inorganics as washed grit from the sewage stream by means of employing a settling chamber or basin, and more particularly by means which provide an open communication or free flow of rejected organics—left behind by the grit—back into the flowing stream of sewage whereby, as the effluent passes from the sedimentation basin or grit chamber, it carries with it all of the organic solids of the original sewage.

The organic solids are of a character which tend to remain in suspension but submerged in the liquid of the body of sewage and, since they also have adhesive characteristics, care must be taken not to interpose in the path of the effluent from the sedimentation basin any obstruction in connection with which there would be an entrapping or holding back of a large portion of the organic solids content of the sewage with the result that the functioning of the sedimentation basin as such would shortly become commercially inoperative after a relatively short period of use. In avoidance of this situation and at the same time to provide a construction wherein the flow through the sedimentation basin is sufficiently slow to realize the desired settling therein as above referred to, it is advisable to arrange the sedimentation basin in respect to the general level of the sewage stream so that an outlet wall or ledge defining the lower bounds for the effluent flowing from the sedimentation basin will be continuously submerged. The ledge or wall should be submerged to a sufficient depth, or, as otherwise expressed, the ledge or wall should be below the surface of the sewage stream a sufficient depth to provide an effluent or outlet flow passageway with suitable vertical cross-section of sufficient depth and transverse horizontal dimension to permit a free or unobstructed passage for the organic solids suspended in the sewage stream as the sewage effluent flows from the sedimentation basin. The flow of sewage through the sedimentation basin is substantially uni-directional, that is, inwardly through an influent section at one end or side of the grit tank providing the sedimentation chamber to and outwardly through an effluent section at the other or opposite end of the tank. The effluent discharge section provides what may be referred to as an effluent discharge located below the top of the tank and more particularly so as to provide an effluent discharge portion that is positioned so as to extend substantially below the operating liquid level of the sewage within the chamber whereby there is sufficient depth of liquid over the submerged ledge or wall, which in fact provides the lowermost defines or sections of the effluent discharge, so that there is not only insured but also encouraged a free passage for organics existing as suspended organic solids in the liquid flowing towards and through the effluent discharge thereby avoiding and preventing any objectionable accumulation of organic solids in the sedimentation chamber of the grit tank.

It has heretofore been proposed to combine a settling tank with a classification device, but in the instance of the past devices they have been employed to separate inorganic solids of different sizes or gravities out of a liquid mixture, and more particularly to obtain the larger or heavier inorganic particles which are delivered from the classifier along one path while the smaller or lighter particles, frequently referred to as undersized, pass from the classifier with the effluent flowing therefrom. Said prior apparatus or devices, in which there is combined a settling tank and a classification device, have not been used in the classification or separation of solids of different types such as are experienced in sewage, namely, in the separating out or in the recovering in a relatively clean form of inorganic solids such as grit and so as to allow organic solids to remain behind as rejected organics which are to be passed from the apparatus with the effluent flowing therefrom. Moreover, attempts to employ the former types of apparatus in which there was combined a settling tank and a classification device led to disaster because there was early experienced in the normal operation thereof defects which rendered said devices functionally impracticable for that class of work—as for example (a) because of there being a collecting in certain zones of the apparatus of a mass of putrescible and offensive organic solids that ultimately built up and contaminated the entire body of liquid undergoing treatment, or (b) because of there being encountered such accumulation of organic solids that there could not be effected a separating out and delivery of grit in cleaned or washed form and with the consequent result that the sand or grit as delivered had mixed therewith an objectionable amount of offensive organic solids.

The construction and arrangement of the parts providing the classifier, which is constructed so as to function as a grit cleaning means, and the grit or settling tank with which the classifier is operatively associated, is such as to provide and insure a free and relatively unobstructed backflow or return of liquid with organic solids in suspension therein from the zone or region where the grit or gritty inorganics leave the liquid in the classifier or grit cleaning means whereby there is avoided and/or prevented in this general locality any undue accumulation of organic solids that would otherwise be harmful or detrimental to the continued operation of the apparatus.

I believe that I am the first to arrange and adapt a combined sedimentation basin and classifier whereby the inorganic solids can be taken from a liquid body containing both organic and inorganic solids, and more particularly in order to eliminate grit in a cleaned or washed condition from a sewage stream wherein there is experienced not only the grit but also organic solids of a putrescible or objectionable nature such as are experienced in city sewage or other forms of industrial or trade waste. It is also to be noted that the grit which is eliminated in a cleaned or washed condition is also dewatered grit.

An important object of this invention is therefore the combination of a settling chamber and a classification compartment so that it may form a unitary apparatus in which the settling chamber can be designed and operated in conformity with established principles of sedimentation and hydroseparation, and of any suitable material including concrete, while the classification compartment can likewise be designed and operated according to the established technology of classification without limitation by the settling chamber construction and operation.

A further object is to provide an efficient continuous mechanically cleaned sewage grit chamber, for which purpose the embodiment of the invention hereinafter described in detail is intended. According to present practice sewage is passed through long parallel channels in which the granular material or grit settles out. These channels are cut out in turn when a sufficient amount of grit is collected, and the grit is removed by grab buckets or the like. As a substantial amount of non-granular or organic matter is necessarily included with the grit thus removed, it is necessary to subject the grit to a washing operation to remove such organic matter which would otherwise render the grit highly offensive.

Although various forms of wet classification apparatus have been well known for a long time, it has been found impractical heretofore to separate the grit from sewage by standard wet classification methods or apparatus which have been successful in other fields of use, owing to the relatively small amount of grit in ordinarily sewage, the great fluctuations in the sewage level between dry weather flow and storm flow, and particularly to the difficulty of separating from the grit certain types of solids, including some of an adhesive nature, together with rags, paper, and the like which cannot be removed efficiently by standard classification methods and which tend to render such types of classification mechanisms unsightly and offensive after a short period of use. For convenience all solids in the sewage except grit will be referred to herein as organic matter.

According to the present invention the grit is initially removed from the sewage by sedimentation in a large comparatively shallow chamber or tank, the settled grit and entrained organic matter being conveyed by mechanical scrapers to the secondary zone of treatment such as a bay or other compartment which preferably is located marginally of the primary chamber and in direct connection therewith. In this compartment is located a classification apparatus which not only removes the grit mechanically, but which is adapted to exert a liquid agitative influence in order to agitate the grit sufficiently to throw the entrained organic solids into suspension whereby they are rejected from discharge by the classifier apparatus and returned to the main settling chamber, from which they are discharged with the overflow, leaving a clean grit for ejection or discharge from the secondary compartment.

It has been found advantageous to employ in the secondary compartment a reciprocating rake mechanism of the type used in standard wet classification apparatus, as the reciprocating action is highly effective in producing the exact amount of agitation desired, and the design and operation of this type of classifying apparatus has been thoroughly worked out and is widely understood.

Classification apparatus of the desired type requires a sloping bottom in the secondary compartment, the grit being discharged over the upper end of such bottom substantially above the water level. It has been found that it is impossible with present known apparatus of this type to remove organic matter which is still included with the grit as the latter reaches the surface of the liquid, since there is not sufficient depth of liquid to carry off the organic matter at this point. An important object of this invention is to provide an arrangement whereby any undersize or more slowly settling solids such as organic matter reaching this point may be removed from the grit by a novel overflow or backflow arrangement.

The slope of the bottom or deck of the classification compartment is determined within narrow limits by the characteristics of the grit; and as the deep end of this compartment is located in the most convenient position to receive the settled solids from the primary chamber, the upper or solids discharge end of the compartment may be located at some distance from the settling chamber. A further object of the invention is the provision of a convenient arrangement whereby the backflow or overflow from such compartment adjacent the liquid level at the grit discharge end may be returned by gravity to the settling chamber regardless of fluctuations in liquid level. Another object is the provision of a lateral overflow arrangement at this point which will minimize the return of grit to the settling chamber with such overflow.

Other objects and advantages of the invention will be apparent from the following description taken in connection with the accompanying drawings in which Fig. 1 is a plan view of one type of apparatus in a duplex arrangement;

Fig. 2 is a vertical section on line 2—2 of Figure 1;

Fig. 3 is a vertical section on line 3—3 of Figure 1;

Fig. 4 is an enlarged fragmentary view showing the supporting and guiding arrangement of the scraping apparatus for the primary settling chamber;

Fig. 5 is a section on line 5—5 of Figure 1;

Figs. 6, 7 and 8 are diagrammatic views taken generally in vertical section longitudinally of the raking apparatus in the secondary compartment and illustrating the discharge of lighter solids carried up by said mechanism;

Fig. 9 is a perspective view of the passage for the discharge of such lighter solids at a point beyond the primary settling chamber, and Fig. 10 is a similar view showing discharge directly into the primary settling chamber.

Figure 1:
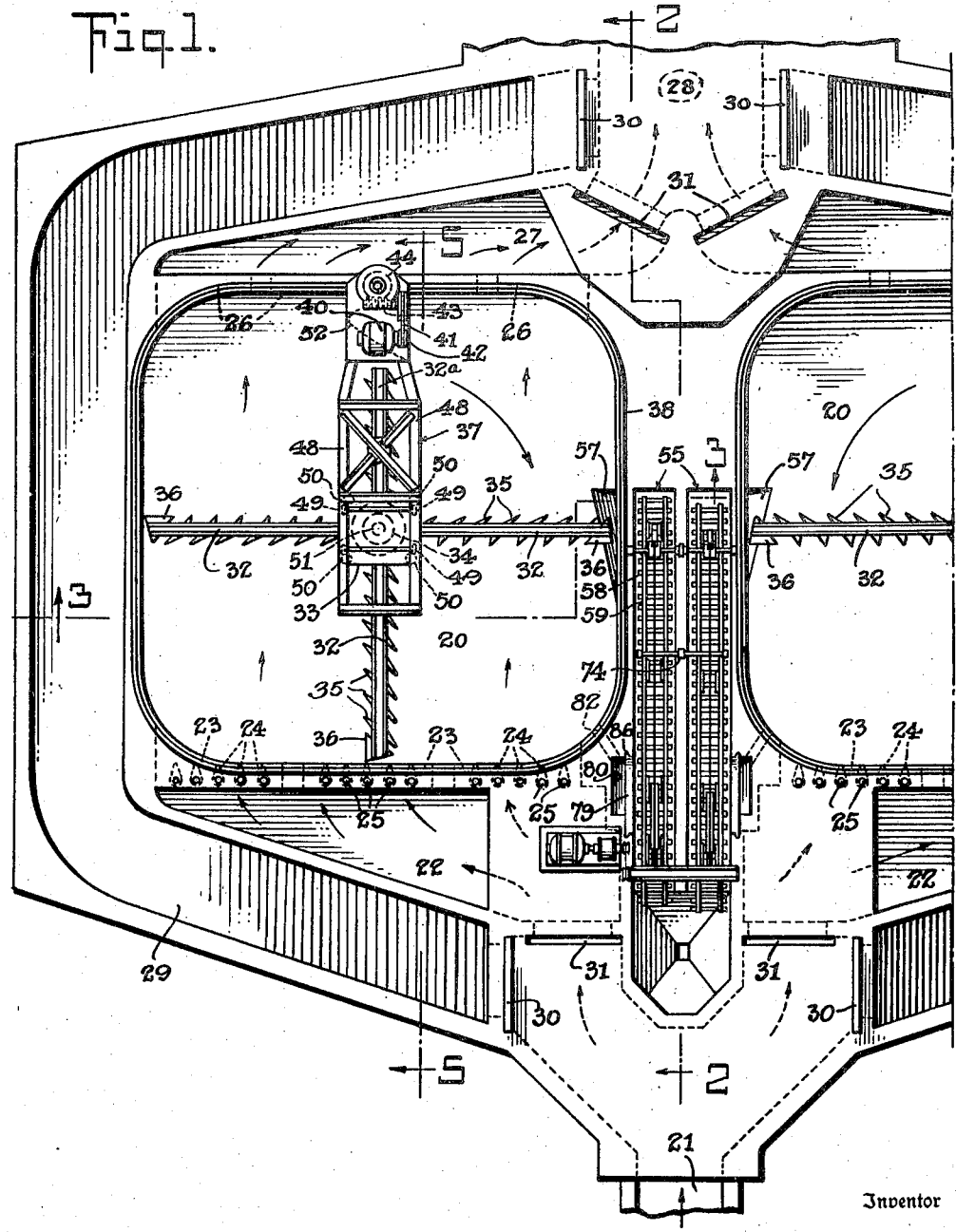

The primary settling chamber 20 may be of any desired shape, grit chambers now in general use being elongated in form; and is provided with suitable mechanism for scraping settled solids to a discharge zone, where they are transferred to the secondary compartment. While the scraping apparatus may operate periodically, it is generally advantageous to employ continuously operating mechanism owing to the substantial reduction in chamber size which is permitted thereby. Various types of known scraping or rake mechanisms suitable for intermittent or continuous operation may be used, depending partly on the shape of the chamber. Where possible it is desirable to employ a mechanism of the rotating type, and to have such mechanism arranged to impel the settled solids outwardly for discharge in a suitable zone at the periphery or margin of the tank, as this permits very convenient location of the secondary or solids washing compartment, within the same tank, if desired. In the preferred form illustrated a rectangular chamber is disclosed, since such chambers provide the greatest economy of space, being particularly desirable where concrete construction is employed, and, by permitting even uniform flow directly across the chamber, resulting in a maximum decrease in velocity, uniform velocity at all points in the chamber, and a consequent efficiency in settling out the solids in a minimum of ground space.

The form shown is designed for use as a sewage grit chamber and lies in the path of a flowing stream of sewage. The sewage enters through the sewer 21 and passes through the influent channel 22 into the settling chamber 20 through inlet openings 23 extending substantially throughout the length of one side or end of the settling chamber 20, and arranged to give a substantially even flow into the chamber at all points. This is conveniently accomplished by suitably tapering channel 22, and by providing distributing vanes 24 adapted to deflect an appropriate part of the influent sewage from channel 22 into the chamber 20. These vanes 24 may comprise vertical blades of concrete suitably streamlined in horizontal section and mounted in openings 23 by vertical spindles 25 accessible for setting the vanes at the desired angles to regulate the proportion of flow into the tank at any given point.

The liquid flows uniformly across the entire chamber at a greatly reduced velocity, the size of the chamber being designed to permit a predetermined period of detention for the pool of liquid, this period being sufficient for all the solids, particularly the gritty inorganics, having a settling rate above a given pre-determined rate, to settle to the bottom of the chamber or pool. The remaining solids, particularly the suspended organics, together with the liquid within which they remain submerged, overflow a submerged wall or ledge 26 (see Fig. 5) positioned so as to have sufficient depth thereover to insure the ready and undeterred passing of the organic solids encountered in the liquid flowing thereover, to wit, of the organic solids found in the effluent passing from the sedimentation chamber of the sedimentation basin, into the effluent channel 27 leading to the outlet sewer 28. This wall or ledge 26 has sufficient depth of submergence below the top surface of the flowing sewage stream to consequently avoid any damming or other deterring effect that would prevent or tend to prevent the passing of organic solids existing as submerged organics in the flowing sewage stream.

The submerged wall construction just referred to provides an essential part of a means by which there is had a ready elimination of the organic solids with the effluent and without effecting a deterring action on the organic solids suspended in the effluent flowing over the wall. The means which provide this construction whereby the apparatus as a whole can continuously function as an efficient, continuous, mechanically cleaned sewage grit chamber, may be broadly referred to as means which provide for the ready elimination without effecting a deterring action, of the submerged organics in the sewage stream and which approach the discharge section of the sedimentation basin with the liquid about to pass as effluent therefrom. A suitable bypass 29 may be provided extending around the chamber 20 between the sewer 21 and the outlet sewer 28, from which it is normally shut off by gates 30. When it is desired to shut down the apparatus said gates can be opened, and suitable gates placed in the guide ways 31 to close the openings connecting the influent and effluent channels to the sewers.

The form of raking mechanism for carrying settled solids to a discharge zone at one side of the settling chamber 20 comprises traveling scraping means such as rake arms 32 mounted on a rotary framework 33 (Figs. 3 and 5) pivotally supported on a pillar 34 in the center of the chamber 20 at a point above the high water level. The vertical scraping blades or rakes 35 extend downwardly from the arms 32 and are set at such an angle that by rotation of the framework and arms the rakes 35 engage settled solids and impel them toward the periphery of the chamber 20. At the outer end of each arm 32 suitable means such as scoop 36 is provided for collecting settled solids raked into its zone of travel and carrying same to a suitable discharge opening or chute. In the form shown the scoop is formed of a vertical curved strip of metal mounted below an arm 32 with its wall nearest the center substantially parallel to the rakes and its outer wall having a slight inward inclination from its leading edge to the point of connection with the central wall, preventing the wedging of grit between the outer wall of the scoop and the wall of settling chamber 20. It will be apparent that the arms 32 will serve to collect all solid matter settling in a circular zone extending from the pillar 34 to the path of scoops 36, depositing such material in the path of the scoops.

For collecting solid material settling outside the zone of action of arms 32 particularly in the corners of chamber 20, and for rotating the framework 33 and the rake arms 32, a sliding frame 37 is mounted on framework 33 and track 38 extending around the periphery of chamber 20. The outer end of the sliding frame 37 carries a wheel 39 (Fig. 5) resting on track 38 to support one end of the frame, with suitable drive means for rotating the wheel. The drive may include a motor 40 mounted on frame 37 and driving through belt 41 the pulley 42 on the shaft of worm 43 which rotates worm wheel 44 whose shaft carries bevel gear 45 meshing with bevel gear 46 on the shaft of the wheel 39. Guide rollers 47 at opposite sides of the track 38 keep wheel 39 in position on the track.

The central end of sliding frame 37 is supported on the rotary framework 33 so as to impart rotary motion thereto and permit the necessary longitudinal movement of frame 37 as the wheel 39 approaches and recedes from the corners of the chamber 20. One arrangement is shown in Fig. 4, in which the rotary framework 33, supported on pillar 34 by suitable rollers 47, carries the longitudinal channels 48 of frame 37 on rollers 49, and carries rollers 50 on vertical axes engaging the inner faces of channels 48 to prevent lateral displacement and to impart the necessary rotary movement to the framework 33. A central pivot pin 51 projecting from the top of pillar 34 and socketed in framework 33 prevents lateral displacement of the framework on the pillar.

A suitable collecting device is mounted on the frame 37 for scraping the corners of chamber 20, and may comprise a scoop 52 of the same general type and construction as scoops 36 having a sufficient spread to cover the distance between the extreme corner of the chamber 20 and the adjacent path of scoops 36. (Arm 32a extending toward scoop 52 should be suitably shortened to avoid interference, and carries no scoop 36). Scoop 52 may be mounted on frame 37 by hangers 53 and 54 connecting the top plate 52a extending across the entire top of the scoop, to the side channels 48 of the frame 37 adjacent the outer and center ends thereof respectively. It has been found that hangers 53 and 54 are efficacious in breaking up any ice which forms in the settling chamber.

The secondary compartment or bay may be located in any position where it can readily receive the settled solids discharged marginally from the settling chamber 20 and return to said chamber any excess of liquid, together with any more slowly settling solids which it is desired to retain in the liquid. A convenient arrangement for this purpose, particularly designed for concrete construction, comprises a trough like secondary or classifying compartment 55 having a sloping bottom with its deep end adjacent the periphery of chamber 20 in position to receive settled solids raked and discharged outwardly from the chamber and with its upper end above high water level. Suitable mechanism is provided for raking the settled solids upwardly along the bottom and ejecting or discharging them in a drained state from the upper end, the mechanism being operable either to rake all settled solids to discharge without throwing them into suspension, or to produce adjacent the mechanism a zone of sufficient agitation to throw the lighter solids into suspension so that they may return to the chamber 20. The latter operation is desirable when the apparatus is functioning as a sewage grit chamber, the agitation serving to wash or otherwise free organic solids from the grit to produce a clean, inoffensive grit without further treatment.

While a considerable variety of mechanisms for performing either or both of these solids-washing or classifying functions either intermittently or continuously is known, apparatus of the reciprocating rake type is preferred since the proper construction and operation of apparatus of this type to produce any desired amount of classifying action, or a simple conveying action, is well understood by those skilled in the art. The preferred form illustrated therefore discloses the use of the well known Dorr Classifier mechanism shown in the United States Patent No. 1,156,543 issued October 12, 1915.

This arrangement, shown best in Figs. 1 and 2, includes a secondary or classifying compartment 55 communicating with one side or margin of chamber 20 immediately adjacent thereto, having a sloping bottom or deck 56. A chute or incline 57 directs sludge from the collecting device in the chamber 20 to the classifying compartment 55, the chute being preferably located adjacent the center of the side of said chamber and extending into the chamber bottom a distance sufficient to permit scoops 36 and 52 to discharge their contents laterally through a restricted marginal exit to be acted upon by the solids washer or classifier. This apparatus, ordinarily referred to as a classifier mechanism, includes a plurality of transverse scraping blades or rakes 58 mounted on longitudinal channels 59 having hanger plates 60 connected by links 61 to the lower arms of bell cranks 62 and 63, the upper arms of which are connected by reach rod 64. The upper bell crank 62 has a depending arm 65 engaging cam 66 on drive shaft 67, the cam imparting through the bell cranks a suitable periodic movement to the rakes toward and from the bottom 56 of the compartment 55. A crank 68 on shaft 67 carries pitman 69 pivotally connected to drive plates 70 on the channels 59, imparting reciprocating movement to the rakes 58 in line with the bottom 56 of compartment 55.

The lower bell crank 63 may be pivotally supported at the end of an arm of the lifting bell crank 71 carried by a transverse rod journaled on the side walls of the compartment 55, the upper arm of bell crank 71 being connected by a cable 72 to a drum 73 which when rotated will lift bell crank 63 and the lower end of the raking mechanism as a unit.

The spray pipe 74 may be employed, extending across the compartment 55 and provided with the usual line of perforations positioned to project wash water on the sand or grit at approximately the zone of emergence from the liquid. To compensate for the substantial changes in water level encountered in sewage operations pipe 74 may be rotatable in its journals 75 on the inside walls of the compartment 55, and may be provided with handle 76 by which the spray may be directed at the proper zone according to the height of the water or sewage.

Where a duplex construction is employed as shown in Fig. 1, the two raking units should be offset on the drive shaft 67 by 180 degrees so that gravitational pull of the mechanism on the return stroke of one unit will assist in the advance raking stroke of the other unit, producing more even load on the motor, as set forth in the above mentioned Patent 1,156,543.

An important feature of this invention is the arrangement of the secondary compartment 55 for the backflow to the primary chamber 20 of liquid from said compartment, together with any solids that are in suspension in the liquid due to rejection thereof by the solids washing classifier and the agitative influence thereof. For this purpose it is advantageous to have open communication that provides a free or relatively unobstructed backflow path between the side of the secondary compartment 55 and the settling chamber 20 as is shown in the embodiment illustrated, such communication being broken only by any pillar 77 that may be necessary to support the wall carrying the track 38 or other superstructure. The backflow provided or permitted by the construction just described may be defined as a free or undeterring backflow.

It has been found in practice that the type of settled solids being handled, together with the amount of draining and agitation required for any particular operation, will determine very accurately the slope of the compartment bottom or inclined deck 56; and as already indicated it is desirable to have the lower end of said bottom in a position determined by the most convenient point of discharge of the settled solids. Under these conditions the compartment bottom 56 may rise above high water level while still adjacent the settling chamber 20; under which conditions it is necessary only to provide lateral open connection or communication between compartment 55 and chamber 20 extending generally at least from near high water level to below low water level (the exact position of this opening being determined by factors hereafter set forth in detail). This arrangement is illustrated in the perspective view in Fig. 10.

In other words, the lateral open communication just described provides the entrance end of a free, relatively unrestricted and relatively unobstructed backflow path leading from the zone or region of gritty solids emergence within the classifier and because of which path, as the result of the super-elevation of the liquid in said zone or region, there follows the relatively free and undeterred backflow by which the rejected organics are passed to the sedimentation basin, and more particularly in and to the stream of sewage flowing through said basin, whereby as the apparatus functions there is an elimination in the effluent leaving the sedimentation chamber of substantially all of the organic solids brought thereinto by the sewage flowing thereto.

Under other conditions the compartment bottom 56 will have its zone between high and low water marks located at some distance from the primary settling chamber 20, either because of the necessary length of compartment 55, because of the contour of the chamber 20 or because of the relative arrangement of chamber and compartment. Under these conditions an arrangement must be provided for the release of liquid, with any solids suspended therein, from the compartment 55 in a zone where the compartment is not in direct communication with chamber 20. It is of course necessary to include in the arrangement means for permitting the escape of liquid without any substantial amount of grit.

In the construction illustrated, as shown best in Fig. 9, an outlet is provided in one side of the compartment 55 adjacent the portion of bottom 56 between high and low water marks. This outlet should be substantially parallel to the bottom and immediately adjacent thereto; but preferably is slightly above the bottom, providing a ledge 78 for retention of the grit. A discharge deck 79 may be employed, forming the bottom of the outlet, over which the liquid flows into a discharge passage 80 having a sloping bottom 81 and discharging into the settling chamber 20 through outlet 82.

A reciprocating mechanism has particular advantages in cleaning the grit and discharging the separated impurities from the grit independently of the grit discharge. With this type of mechanism the rakes on their advance movement carry up with them a certain amount of liquid in the region where the secondary compartment 55 is not in open communication with the chamber 20. That is, as a rake emerges from the liquid, it carries before it a portion of the liquid to a position superelevated above the liquid level of the main body. This superelevating or creation of waves is progressively carried out as indicated in Figs. 6 to 8 wherein it can be seen that the liquid between adjacent rakes is higher as the upper sloping end of the classifier is approached. It is in this superelevated zone that the agitation or surge therein causes separation and flotation of the organics from the grit. This effect, illustrated in Fig. 6, is utilized in the discharge arrangement shown in Fig. 9, since the liquid thus raised above normal level by the rakes flows laterally over the deck 79 at a suitable velocity, serving to carry off the lighter solids without permitting them to settle again on the grit. That is, the side or lateral outlet from this superelevated zone is communicated through the apertures 88. Such an arrangement produces a lateral or crosswise flow of the liquid across the classifier in this zone and this lateral or sideways flow carries with it the floating or substantially floating organics. Thus, the organics are promptly removed from the zone of superelevation or of separation from the grit, as soon as their separation takes place.

Where the lateral flow arrangement indicated is employed, it is difficult to prevent the discharge of a substantial amount of grit with the lateral overflow carrying the organic solids back to the settling chamber; and while ledge 78 will serve to retain the grit, it will likewise entrap a certain amount of liquid. It has been found in practice however that with the reciprocating rake type of classifier, the rise of the rakes at the end of the feed stroke will suddenly release the liquid thus entrapped, and such liquid flowing back over the surface of the sand will wash the surface clear of any organic residuum, which is returned to a zone from which it can readily overflow on the next stroke of the rakes.

It has also been found that the location and extent of the discharge 83 is very important where a reciprocating rake classifier mechanism is used. It will be apparent that the discharge 83 must be of sufficient extent to accommodate the substantial fluctuations in liquid level encountered in sewage treatment. Consequently the lower end of the discharge 83 must be sufficiently below water level to permit overflow when the sewage is at its lowest level. It has been found however that where deck 79 is used it is not necessary to locate the upper end of passage 83 at the highest level of liquid raised by the rakes when the sewage is at its maximum height, since the overflow onto deck 79 will flow back along the deck to a substantial distance, this distance being determined by the point at which such backflow meets the upward surge of the liquid due to the next stroke of the rakes. The upper end of discharge 83 therefore may be located this distance below the upper end of deck 79, the latter being of course at the highest point where any lateral overflow can occur.

Where there are extreme changes in sewage level, there may at times be a tendency for the grit to overflow across deck 79, especially near the lower end thereof, when the sewage is at a high level. In order to decrease this tendency means may be employed for restricting the lateral overflow across deck 79. The level of the bottom of the discharge opening 83 may be adjustably raised, as by suitably positioned boards 85 set in slots 86. A plurality of smaller openings may be substituted for the open passage 83, as by a suitable partition 87, (Fig. 8), which may be set in slots 86, extending above high water level and provided with a series of discharge openings 88 parallel to and adjacent the deck 79, the openings being designed and arranged to permit discharge of the liquid while restricting its velocity, particularly toward the lower end of the deck 79. This restriction will be particularly efficacious since under high water conditions the sewage level behind the partition 87 will approach the level on the grit discharge side, reducing further the tendency for high velocity at points substantially below the liquid level.

It will be understood that while deck 79, ledge 78 and the elongated overflow arrangement are all highly advantageous and useful under ordinary conditions, changes in the type of mechanism employed, the arrangement of the compartment and the material operated may readily produce conditions under which these features are not necessary.

From what has preceded and more particularly in connection with accompanying drawings it will be noted that:—

The general sewage treating apparatus or sewage treating system has a sedimentation basin or settling tank that is provided in a flowing stream of sewage and which basin has a restricted or small marginal discharge through or past which settled sludge, after having been collected along a path at the bottom of the basin and as transferred along said path to the marginal discharge, passes into a classifier constituting a part of the apparatus or system;

The inclined blades or rakes 35 and the supporting members or arms 32 are operated so that thereby there is provided what may be termed a sludge collecting mechanism for progressively impelling, by step by step movement, sludge settled at the bottom of said sedimentation basin into and along the transfer path or defined collecting zone at the bottom of said sedimentation basin and it will be clear that during this impelling or step by step movement there is imparted to different sections of the sludge compound movements having a forward component along the path of travel of the impelling blades acting thereupon and lateral components consequent to the plowing action of the inclined blades as the collecting mechanism functions;

The scrapers or scoops 36 (also to a certain extent the scoop 52) extend across the collecting zone or transfer path and are supported at the ends of the arms or members 32 (or in the case of scoop 52 by frame 37 that overlies and extends radially outwardly beyond arm 32a) and are operated in such a manner as to provide what may be collectively termed a sludge transfer mechanism particularly since these scrapers or scoops and the operative means therefor serve to transfer forwardly or ahead of the same to the restricted or small marginal discharge the collected sludge impelled into the path of the transfer scrapers or scoops 36 because of the angular disposition or inclination of the blades or rakes 35. It will be clear that the path of scrapers or scoops 36 actually parallels, and that the path of the scoop 52 effectively parallels, the movement of the inclined blades or rakes 35. The mechanism which includes the inclined rakes or blades, and the scrapers or scoops 36 may be referred to as means for collecting settled sewage sludge along a defined zone or path and for transferring the collected sludge along said path to the restricted or small discharge;

The collecting zone or transfer path extends to and in effect terminates in the small or restricted marginal discharge referred to and there is a sloping or inclined floor portion, as 57, leading to a receiving space provided in the classifier and which inclined floor facilitates the directing of the sludge being transferred from the large main section of the bottom of the sedimentation basin into the desired section of the classifier.

The classifier comprises what may be considered as a classifier trough having a sloping floor or inclined deck 56 a part of which is submerged. In the region above the lower end of this partially submerged deck there is provided the receiving space into which the sludge is delivered as it is passed over and along the inclined floor of or for the marginal discharge. The classifier also has an operating classifying element located above and along said inclined deck or floor and which comprises members such as the longitudinal channels 59 and scraping blades or rakes, as 58, and which as it operates along the floor functions to move solids of the sludge upwardly along said sloping floor whereby inorganic solids will pass from the liquid within the classifier trough while leaving behind organic solids which may be considered as rejected organics and which remain submerged in the liquid at or near the zone or region where the inorganic solids emerge from the liquid. Said operating element also functions to convey the emerged inorganic solids to a point constituting a discharge section at the upper end of the classifier trough. The inorganic solids thus discharged are relatively freed or ridded of organic solids formerly entrained therein or mixed therewith and are in the form of what may be termed washed grit;

An important feature of the general apparatus or sewage system as constructed and operated resides in the constructing of the apparatus so that, or as otherwise expressed the providing the apparatus with means, whereby liquid containing the rejected organics will pass or will be passed from the region or zone at or near the place where the inorganic solids emerge from the liquid to and into the flowing stream of sewage, and in the apparatus or system as shown such means is provided by a by-pass arrangement providing an open communication leading through a side wall of the classifier trough, thence through a passageway in an upright wall portion of the sedimentation basin. In fact in the construction shown there is provided an overflow or outflow opening in the side wall of the classification trough and this overflow or outflow opening provides the entrance end of a conduit leading into the sedimentation basin and which permits a free or relatively undeterred flow of liquid with rejected organics therein consequent to superelevation resulting from the functioning of the operating element within the classifier trough; an important aspect or feature of the apparatus or system is the insuring or causing of the passing of liquid with rejected organics therein from said zone or region in the vicinity of the zone of emergence whereby the continued delivery of washed inorganic solids can follow and take place as the classifying apparatus functions. Such would not be the case if there were not an early and ready removal from this zone of the rejected organic solids which would otherwise accumulate and obstruct the proper functioning of the apparatus.

As previously indicated and as is clear from what has preceded, it will be noted that the effluent from the sedimentation tank or basin carries with it over the submerged ledge 26 along a relatively free or unobstructed path and without any deterrent action thereof (a) the organic solids entering the sedimentation basin and which were not deposited therein with the sludge which is ultimately subjected to classification and (b) also the returned organic solids which pass without sedimentation from the sedimentation basin with the result that as the apparatus functions it serves to deliver washed grit relatively free and clear of organic solids while all, or at least substantially all, of the organics that enter the sedimentation basin ultimately pass therefrom with the effluent leaving the same.

I claim:

1. Apparatus for removing solids from liquids comprising a classification compartment having a sloping bottom, a plurality of raking blades traveling along said bottom for conveying settled solids upwardly to a discharge above the liquid level, a lip extending upwardly from said bottom along a side of the compartment from the maximum liquid level to the minimum liquid level adjacent the zone of discharge of the settled solids from the liquid, the upper edge of said lip comprising a margin of an overflow outlet located below the level of the upper effective edges of said rakes, a restricted discharge passage for the overflow, and a ledge extending from the upper edge of said lip to the passage for conveying the overflow thereto.

2. In a sedimentation system for treating sewage, in operative combination, a grit tank providing a sedimentation chamber into one section of which the influent enters and from an opposite section of which the effluent flows through a discharge passageway located below the top of the tank sufficiently to permit a free and ready passage from the sedimentation chamber of organic solids in suspension in the liquid flowing to and as an effluent through the discharge section whereby any undue accumulation of organic solids in the sedimentation chamber is prevented or avoided; grit collecting and transferring means having members operative over the diverse sections of the floor or bottom of the sedimentation chamber for collecting and transferring sludge, that includes settled gritty inorganics and some organic solids, to and under the operative influence of the grit cleaning means immediately hereinafter referred to; and grit cleaning means receiving the collected and transferred sludge and separating the grit from the organic solids and the liquid removed therewith and restoring such organic solids and liquid to the grit chamber.

WILLIAM C. WEBER.

CERTIFICATE OF CORRECTION.

Patent No. 1,997,161.  April 9, 1935.

WILLIAM C. WEBER.

It is hereby certified that error appears in the printed specification of the above numbered patent requiring correction as follows: In the heading of the drawings and printed specification, original date of filing, for "December 14, 1928" read December 24, 1928; and that the said Letters Patent should be read with these corrections therein that the same may conform to the record of the case in the Patent Office.

Signed and sealed this 18th day of June, A. D. 1935.

Leslie Frazer (Seal)  Acting Commissioner of Patents.